June 21, 1927.
F. THIETTEN
1,632,861
ATTACHMENT FOR SEED PLANTERS
Filed Dec. 17, 1923
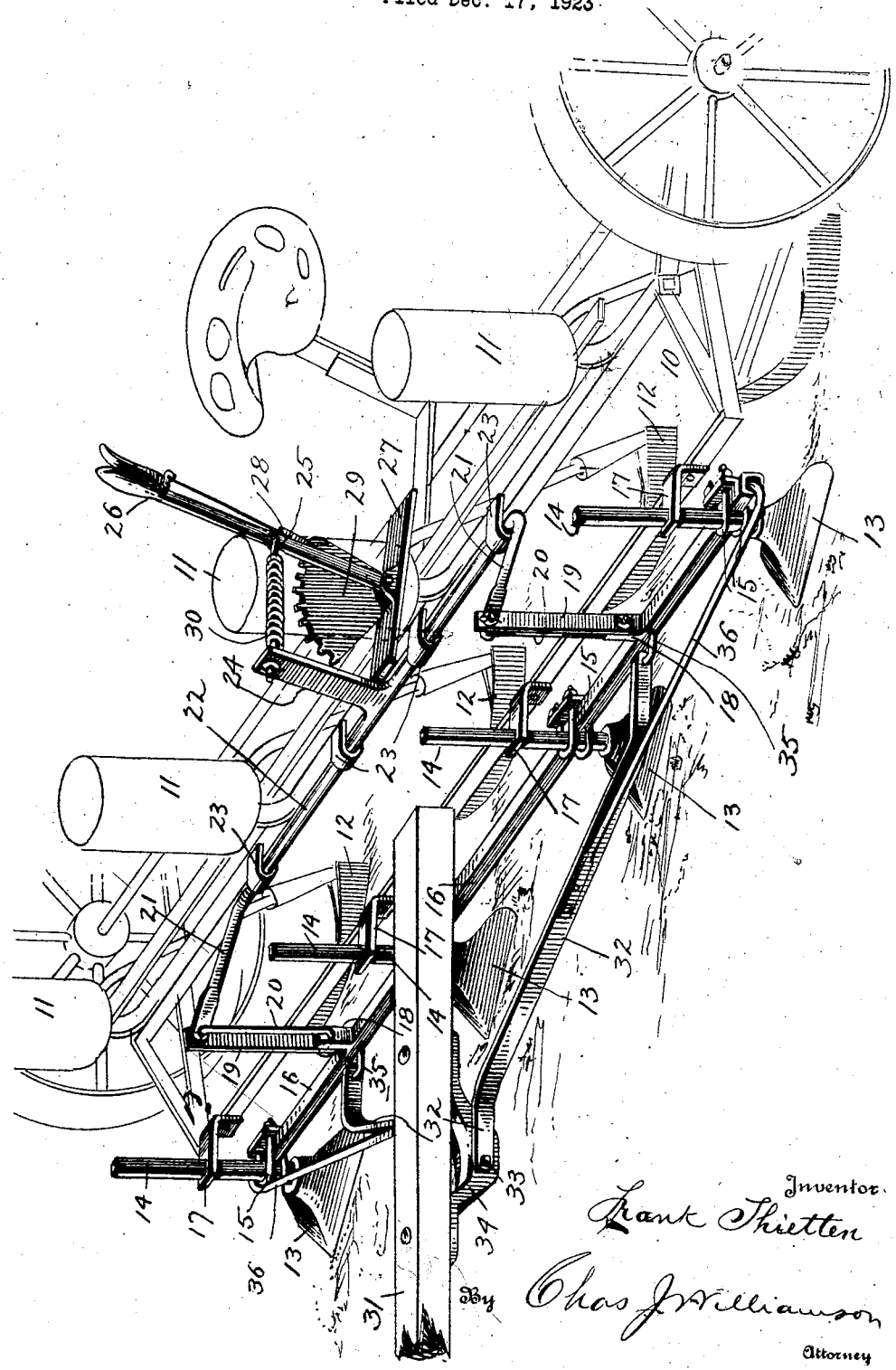

Patented June 21, 1927.

1,632,861

UNITED STATES PATENT OFFICE.

FRANK THIETTEN, OF TWIN FALLS, IDAHO, ASSIGNOR OF ONE-THIRD TO CLIFTON I. DAVIS AND ONE-THIRD TO WILLIAM S. THIETTEN, BOTH OF TWIN FALLS, IDAHO.

ATTACHMENT FOR SEED PLANTERS.

Application filed December 17, 1923. Serial No. 681,129.

The main object of my invention is to provide means by which seed planted by furrow opening machines such as drills, will give larger and better crop results than are secured by this type of planting machine as ordinarily constructed, and to accomplish this object by mechanism which is in the form of an attachment complete in itself and which may be applied to the drill or planter as ordinarily made and in use without any structural alteration of its original construction. By my invention dead weeds and other trash are removed from the ground where the runners make the furrows, thus assuring a cleaner furrow for the seed than otherwise would be the case and better covering of the planted seed and hence better germination and a larger percentage of seed germinating, and growing weeds, grass, etc. are removed and destroyed in the path of the furrows thus in that respect improving the seed bed and hence promoting the early growth of the crop and a more vigorous growth thereof. My invention consists in whatever is described by or is included within the terms or scope of the appended claims.

In the annexed drawings the figure is a perspective view illustrating one embodiment of my invention applied to a well known drill for planting beets and beans.

It is unnecessary to describe in detail the construction of the beet and bean drill shown in the drawings, it being enough to say that it is a well known type, which includes a horizontally extending frame, 10, supporting seed boxes, 11, and furrow openers or runners, 12.

My attachment comprises a shovel, 13, for each runner 12, which in use is supported in advance of the runner so that in advance of the furrow made by the runner it will engage and by its rearwardly diverging inclined sides will brush to one side any dead weeds or loose trash lying on the ground and will cut up and shove to one side any growing weeds, grass, etc. so that a clean path of earth will be prepared for each furrow opener as it falls or tracks behind the shovel. Each shovel is secured to the lower end of a vertical post or shank, 14, which passes through a pair of vertically alining U-bolts, 15, which are clamped to a horizontal tubular bar, 16, that extends across the machine in advance of the planter frame, 10, and said shanks also pass through openings in guide plates or brackets, 17, which are attached to the front bar of the frame, 10, so that the shovels being thus rigidly clamped to the tubular bar, 16, may be raised and lowered by corresponding movement of said bar, 16, being guided and supported by the brackets, 17. To each of two short vertical standards, 18, securely fastened to the upper side of the supporting bar, 16, well towards the ends thereof a link comprising a flat iron strap, 19, and an iron rod, 20, is pivotally connected by the inturned lower end of the rod which link at its upper end by the inturned end of said rod is pivotally connected to the crank arm, 21, of a rock shaft, 22, which by several spaced clips or brackets, 23, is supported by the middle bar of the frame, 10, by the rocking of which shaft, 22, the shovels may be moved vertically to completely clear the ground when the planter is to be turned or to place them at the desired depth within the ground. The rock shaft, 22, has a radial arm, 24, extending upwardly at its center which by a rod, 25, is connected with a hand lever, 26, pivoted to a supporting plate, 27, in convenient reach of the driver on the seat who is thus able conveniently to move the shovels vertically which are held in the desired vertical position by a latch, 28, and quadrant, 29. Upon the rod, 25, between the radial arm, 24, and the handle, 26, is a coil spring, 30, to absorb shocks or serve as a cushioning or yielding connection between the rock shaft and the lever, 26.

A draft connection is made between the tubular bar, 16, and the tongue, 31, which includes draft bars, 32, pivoted at their forward ends by a main bolt, 33, to a hitching, 34, bolted to the underside of the tongue, which draft bars, 32, diverge rearwardly and at their rear ends are pivotally connected to the tubular bar, 16, by U-bolts, 35, and from each draft bar extends an outwardly diverging rod, 36, which is fastened thereto at its forward end and at its rear end is curved or bent inward to engage the open end of the tubular bar, 16.

It will be seen that by my invention I provide a complete attachment for drills or furrow opening planters that is of a minimum number of parts which makes for lightness and economy of manufacture, is strong and sufficiently rigid so that the shovels will precede the runners with precision, and while having required rigidity for that purpose has flexibility in the sense that the shovels may be placed in and removed from position for work and adjustment of the shovels to work the desired distance below the surface of the ground.

It will be understood that the planter shown in the drawings is so shown simply for the illustration of a typical planter with which my attachment may be used and without any intention of limiting the application of my invention.

What I claim is:

1. An attachment constituting an auxiliary for planters using furrow openers comprising shovels, a cross bar to which the shovels are attached, the shovels having vertical shanks, guides for the shanks for attachment to the planter frame in advance of the furrow openers thereof, hand operated means adapted to be mounted on said frame acting on said bar to move the same and the shovels vertically, draft bars extending between said shovel supporting bar and means for attachment to the draft tongue of the planter.

2. The combination of a planter constituting a complete implement in itself having furrow openers and a frame bar at the front, shovels alining with the respective furrow openers in advance thereof, a cross bar in advance of said frame bar to which the shovels are attached, guides for vertical movement of the shovels attached to said frame bar, draft means extending forwardly from said shovel supporting bar, a tongue with which said draft means are attached, a rock shaft mounted on the planter frame, a lever for moving said rock shaft and links connecting the rock shaft and said shovel supporting bar.

3. The combination of a planter constituting a complete implement in itself including a supporting frame, a driver's seat, carrying wheels, furrow openers and a transversely extending frame bar at the front, and an auxiliary having means for attachment to said front frame bar and comprising a cross bar in advance of said frame bar, shovels aligning with the respective furrow openers in advance thereof to which cross bar the shovels are attached, guides for vertical movement of the shovels attached to said frame bar, a rock shaft pivoted to a member of the main implement and extending transversely forward of the driver's seat, a lever within reach of the seat occupant for rocking said shaft, and links connecting the rock shaft and said shovel supporting bar.

In testimony whereof I hereunto affix my signature.

FRANK THIETTEN.